United States Patent [19]

Kazmierczak et al.

[11] Patent Number: 5,719,096
[45] Date of Patent: Feb. 17, 1998

[54] LIQUID PEROXIDE COMPOSITIONS

[75] Inventors: Robert Thaddeus Kazmierczak; Ronald Edward MacLeay, both of Erie, N.Y.

[73] Assignee: ELF Atochem North America, Inc., Philadelphia, Pa.

[21] Appl. No.: 368,582

[22] Filed: Jan. 4, 1995

Related U.S. Application Data

[62] Division of Ser. No. 149,145, Nov. 5, 1993, which is a continuation of Ser. No. 938,732, Aug. 31, 1992, abandoned.

[51] Int. Cl.$^6$ ..................................... B01J 31/02
[52] U.S. Cl. ........................................... 502/160
[58] Field of Search ................................. 502/160

[56] References Cited

U.S. PATENT DOCUMENTS

| | | | |
|---|---|---|---|
| Re. 25,941 | 12/1965 | Gregorian | 260/94.9 |
| 2,819,256 | 1/1958 | Boardman | 260/92.3 |
| 2,826,570 | 3/1958 | Ivett | 260/94.9 |
| 3,584,059 | 6/1971 | Schappell | 260/610 A |
| 3,764,628 | 10/1973 | Gregorian et al. | 525/333.8 |
| 4,202,790 | 5/1980 | Steller | 502/160 |
| 4,239,644 | 12/1980 | Nambu et al. | 252/186 |
| 4,450,302 | 5/1984 | Willis | 502/160 |
| 4,866,137 | 9/1989 | Pagliari et al. | 525/330.3 |

OTHER PUBLICATIONS

Chem. Abs. 85, 142748d 1976, —(Abstracting—Izv. Vyssh. Uchem. Zared., Khim,Khim Tekhnol. 1976, 19(6) 873–5).
J. Org. Chem. 39, pp. 2091–2096, Elson et al.
J. Macromol. Sci.–Chem., A13(8) pp. 1067–1080, 1979 Yamamoto et al.
Chem., Rev., 71, pp. 247–294, Gray et al.
Encyclopedia of Poly. Sci & Eng. vol. 4, p. 385, John Wiley & Sons (2nd Ed.–1986).

*Primary Examiner*—Joseph L. Schofer
*Assistant Examiner*—Wu C. Cheng
*Attorney, Agent, or Firm*—Stanley A. Marcus; Royal E. Bright

[57] ABSTRACT

This invention relates to novel peroxide blends which are liquid at 25° C. and lower, their method of preparation and their use in curing peroxide crosslinkable polymers.

The blend is a mixture of the meta isomers or the meta and para isomers of the compounds of Formulae I, II and III and optionally Formula IV (all as defined herein) in such proportions that the composition provides a liquid mixture at 25° C. or below which has a high crosslinking efficiency for polymeric materials.

15 Claims, No Drawings

LIQUID PEROXIDE COMPOSITIONS

This application is a division of Application Ser. No. 08/149,145, filed Nov. 5, 1993 which is a continuation of Application Ser. No. 07/938,732 filed Aug. 31, 1992, now abandoned.

BACKGROUND OF THE INVENTION

1. Field of the Invention

This invention relates to novel compositions classified in the art of chemistry as organic peroxides, more specifically to organic peroxide blends which are liquid at room temperature, their method of preparation and their use in curing peroxide crosslinkable polymers.

Still more specifically the organic peroxides comprise alpha-alpha'-ditertiary alkylperoxy derivatives of the meta, or mixed meta, para isomers of diisopropylbenzene. The compositions are useful in curing peroxide cross-linkable polymers and in initiating polymerization reactions of suitable monomers.

The novel compositions of the invention include a peroxide blend which comprises 5 to 65 parts by weight of bis(2-t-butylperoxy-2-propyl)benzene, a diperoxide of Formula I

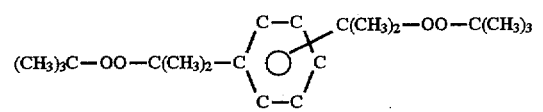

from 10 to 55 parts by weight of 1-(2-t-butylperoxy-2-propyl)-3 or 4-(2-t-amylperoxy-2-propyl)benzene, a diperoxide of Formula II

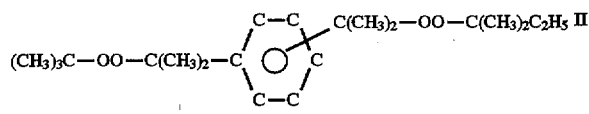

and from 3 to 55 parts by weight of bis(2-t-amylperoxy-2-propyl)benzene, a diperoxide of Formula III

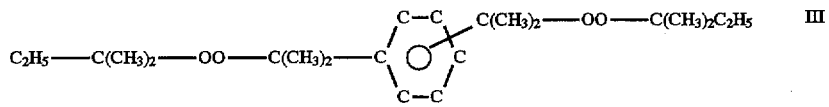

Wherein the meta to para isomer ratios of each of I, II and III are selected to provide a blend which is liquid at 25° C. or lower.

Preferably, the peroxide blend comprises from about 7 to 61 parts by weight I, from 30 to 55 parts by weight II and from 3 to 47 parts by weight III where the ratio of the meta isomers to the para isomers can vary from at least 1.5:1 to all meta isomers.

More preferably, the peroxide blend comprises from 35 to 60 parts by weight I, from 35 to 55 parts by weight II, from 5 to 20 parts by weight III and the ratio of the meta isomers to the para isomers can vary from at least 1.5:1 to all meta isomers.

The peroxide blend may optionally contain small amounts, up to 15% by weight of the peroxide blend, of the meta, para or a mixture of the meta and para isomers of the monoperoxides of Formula IV

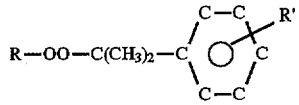

where R may be t-butyl or t-amyl and R' may be hydrogen, isopropyl, isopropenyl or 2-hydroxy-2-propyl.

The novel blends are efficient crosslinking agents for peroxide crosslinkable polymers such as low, linear low and high density polyethylene, curing agents for ethylene-propylene elastomers such as EPDM, curing agents for polyester resins and initiators for vinyl polymerization.

2. Description of the Prior Art

It is well known in the art to use dicumyl peroxide (V), bis(2-t-butylperoxy-2-propyl)benzene (I) and bis(2-t-cumylperoxy-2-propyl)benzene (VI)

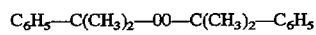

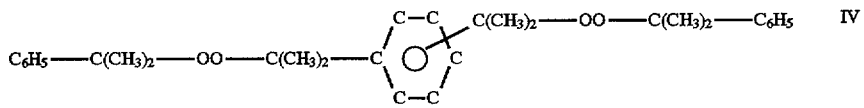

as crosslinking agents for polyethylene or ethylene-propylene elastomers (see U.S. Pat. Reissue 25,941 issued to W. R. Grace & Co., Dec. 14, 1965 and U.S. Pat. No. 4,239,644). The meta and para isomers of I are solid at room temperature as are all mixtures thereof. The meta isomer melts about 52° C., the para isomer melts about 79° C. and the eutetic mixture (80% meta isomer) melts about 45° C. Dicumyl peroxide melts about 38° C. (see U.S. Pat. No. 4,202,790). Compound VI is also a solid at room temperature. This leads to serious commercial problems. Blending of solid peroxides with polymers, such as polyethylene, is commercially avoided due to the difficulty in obtaining uniform dispersions of the peroxide on the polymer. A uniform dispersion is essential if one is to obtain a uniformly crosslinked polymer in a subsequent step. Therefore the above peroxides are melted and kept in the molten state so they can be uniformly metered into the polymer. Careful monitoring of the peroxide temperature during the melting step and subsequent blending step is required to prevent overheating which can result in rapid decomposition and may even result in an explosion. Commercially the melting step has been accomplished by installing melt stations or by using liqua-bins which are storage bins containing coils with hot water circulating through them. These melting operations have added considerable expense to the operation. Therefore it is highly desirable to develop a commercial, non-volatile and highly efficient peroxide crosslinking agent for polymers such as polyethylene, which is a liquid at room temperature.

Liquid peroxides such as t-butyl t-cumyl peroxide are too volatile for most commercial crosslinking operations and have been known to cause flash fires. Cumyl isopropylcumyl peroxide (described in U.S. Pat. Nos. 2,819,256 and 2,826,570) is a liquid peroxide but is not as efficient as dicumyl peroxide (see U.S. Pat. No. 4,239,644, col. 1 lines 56–57). Consequently, it is not used commercially.

In an attempt to overcome the above shortcomings, liquid peroxide blends have been prepared where the solid peroxides are dissolved in liquid peroxides in such proportions that a blend is obtained which remains liquid at room temperature (25° C.) or below. The liquid blend can then be readily admixed with polymers such as polyethylene to provide uniform blends of peroxide and polymer prior to the crosslinking operation.

U.S. Pat. No. 4,239,644 issued to Mitsui Petrochemical Industries, Ltd. discloses liquid peroxide blends comprising 70–5 parts by weight dicumyl peroxide V and 30–95 parts by weight of a substituted dicumyl peroxide of Formula VII

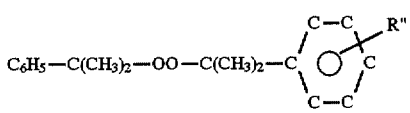

where R" is a 1–3 carbon alkyl group. Preferably the blend contained 10 to 60 parts dicumyl peroxide and 90 to 40 parts VII. The blends were reported to have efficiency comparable to dicumyl peroxide. The patent also describes methods of making these blends by reacting cumene hydroperoxide with a mixture of cumyl alcohol and the substituted cumyl alcohol VIII

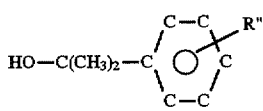

in the presence of an acid catalyst or by reacting cumyl alcohol with a mixture of cumene hydroperoxide and the substituted cumene hydroperoxide IX

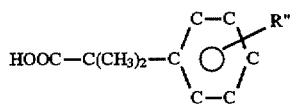

in the presence of an acid catalyst.

U.S. Pat. No. 4,202,790 issued to Hercules Inc. discloses novel blends of peroxides that are liquid at room temperature. Blend 1 consists essentially of 25–55% dicumyl peroxide and 75–45% cumyl isopropylcumyl peroxide (VII where R" is isopropyl). Blend 2 consists essentially of 10–25% bis(2-t-butylperoxy-2-propyl)benzene (I) and 90–75% t-butyl isopropylcumyl peroxide (X).

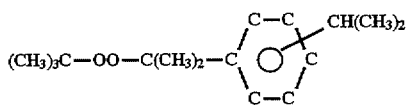

The maximum concentration of I (the preferred crosslinking agent) is only 25% and the major component X is a rather volatile component.

Blend 1 was prepared by dissolving dicumyl peroxide in cumyl isopropylcumyl peroxide. Blend 2 was prepared by dissolving bis(2-t-butylperoxy-2-propyl)benzene (essentially a 2:1 mixture of the meta and para isomers) in X. The blends were used to cure polyethylene compositions at 360° F.

U.S. Pat. No. 4,866,137 issued to Ausimont S.p.A. discloses liquid peroxidic compositions containing from 1 to 50 parts by weight of a diperoxide of Formula VI, from 5 to 75 parts by weight of dicumyl peroxide of Formula XI

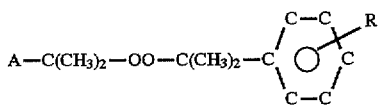

where R'" is hydrogen or an alkyl group containing from 1 to 3 carbon atoms and wherein A is selected from the methyl radical or the phenyl radical, optionally substituted.

The meta:para ratio of VI may range from 1.2 to 2.5 and preferably is between 1.5 and 2.1. This peroxide is commercially known as Peroxyimon 169. This patent states that peroxides of structure VI are more efficient in the crosslinking of polyethylene. When mixtures of dicumyl peroxide and peroxides of Formula VII (Ger. Offen. 2,912,061) are used, approximately 20–35% by weight more peroxide is required than when dicumyl peroxide alone is used. The blends are prepared by reacting cumene hydroperoxide with a mixture of cumyl alcohol and the monoalcohol XII and the diol XIII

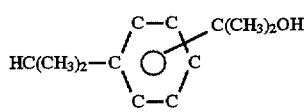

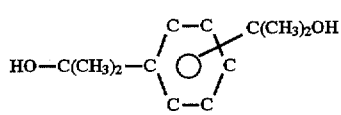

in the presence of an acid catalyst such as p-toluenesulfonic acid. In some cases, a peroxide of Formula XI is added to the peroxide blend after it has been washed and stripped of volatiles. The blends were used to crosslink polyethylene.

The Russians have prepared asymmetric diperoxides XV by reacting hydroperoxides with p-diisopropylbenzene hydroxyperoxides of Formula XIV.

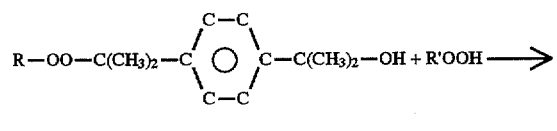

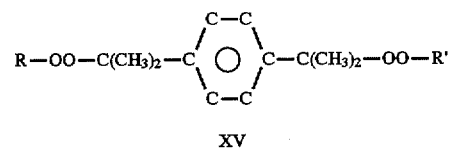

R=t-butyl, t-amyl, t-cumyl R'=t-butyl, t-amyl, t-cumyl (M. A. Dikii, M. S. Vaida, V. A. Puchin, Izv. Vyssh. Uchebn. Zaved., Khim. Khim Tekhnol. 1976, 19(6), 873–5(Russ.); C. A. 85, 142748d). To the best of our knowledge the corresponding meta isomers are not known.

We have unexpectedly found that we can prepare more efficient liquid peroxidic crosslinking compositions by reacting a mixture of t-amyl and t-butyl hydroperoxides with diols of Formula XIII in the presence of an acid catalyst. The diol XIII may be the meta isomer or a mixture of the meta and para isomer.

The reaction product of the diol XIII and the mixture of hydroperoxides is a mixture of compounds of Formulae I, II, and III. If a mixture of the meta and para isomers of the diol XIII is used, then the products I, II, and III will also be mixtures of the meta and para isomers. The distribution of the products I, II, and III is dependent upon the ratio of the t-butyl hydroperoxide to the t-amyl hydroperoxide starting materials. A slight excess (about 2.1–2.3 moles of hydroperoxide per mole of diol) of hydroperoxide is used in all the reactions to insure essentially complete peroxidation of the diol. The ratio of the meta to para isomer of each I, II, and III is approximately the ratio of the meta to para isomers in the starting diol.

If only the meta diol is used or the ratio of meta to para isomer is 4:1 or greater and the molar ratio of t-butyl hydroperoxide to t-amyl hydroperoxide is 2.35:1 or less, the reaction product after washing and stripping of volatiles is a liquid at 25° C. As the molar ratio of the t-butyl hydroperoxide to t-amyl hydroperoxide decreases, the freezing point of the liquid product decreases. The ternary mixture of I, II and III remains liquid at 15° C. up to a molar ratio of tert-butyl groups/(tert-butyl groups+tert.amyl groups) of 0.59.

If a mixture of the meta and para diols are used, peroxide mixtures which are liquid at 25° C. or lower can be obtained if the ratio of t-butyl hydroperoxide to t-amyl hydroperoxide is low enough. A 50—50 mixture Of the meta and para diol will generate a peroxide liquid at 25° C. if the ratio of t-butyl hydroperoxide to t-amyl hydroperoxide is 1.1:1 or less. As the percentage of meta diol in the meta-para diol mixture increases up to 80%, a larger mole ratio of t-butyl hydroperoxide to t-amyl hydroperoxide may be used. A 70% meta-30% para mixture of the diol will generate a peroxide liquid at 25° C. if the ratio of t-butyl hydroperoxide to t-amyl hydroperoxide is 2.2:1 or less. Optimally to prepare a peroxide mixture liquid at 25° C. and with high crosslinking efficiency at minimal cost, a diol mixture containing about 70% to 90% meta diol and a hydroperoxide mixture containing a mole ratio of t-butyl hydroperoxide to t-amyl hydroperoxide of about 2.25:1 to 1.75:1 should be employed.

The meta and para isomers of III are known and are claimed to be useful as polymer crosslinking agents (U.S. Pat. No. 3,584,059). However, they are not used commercially because they are not as efficient as the corresponding t-butyl peroxides (I).

t-Amyl peroxides are not normally employed as commercial crosslinking agents. t-Amyl peroxides decompose into t-amyloxy radicals which readily break down by beta-scission into acetone and ethyl radicals (I. H. Elson and J. K. Kochi, J. Org. Chem. 39, 2091–2096 (1974)). Ethyl radicals do not abstract hydrogen radicals as readily as methyl radicals or t-butoxy radicals which are generated by the decomposition of t-butyl peroxides (K. Yamamoto and M. Sugimoto, J. Macromol. Sci.-Chem., A13(8), 1075(1979)). For abstraction of hydrogen from neopentane and cyclohexane, at 164° C., the ethyl radical is less reactive by a factor of between 6 and 24 (P. Gray, A. A. Herod and A. Jones, Chem. Rev., 71, 287 (1971)).

Peroxide crosslinking of polyethylene is initiated by free radicals generated in the peroxide decomposition. The free radicals abstract hydrogen from the polyethylene backbone to generate radical sites on the backbone. The radical sites on neighboring polymer chains then couple to form a crosslink between polyethylene chains (Encyclopedia of Polymer Science and Engineering, Second Edition, Vol.4, p.385, Wiley-Interscience, New York, N.Y., 1986). Since the ethyl radicals generated from the decomposition of t-amyl peroxides are much less reactive than the methyl or t-butoxy radicals generated from t-butyl peroxides, one would expect the t-amyl peroxides to be much less efficient polyethylene crosslinking agents than the corresponding t-butyl peroxides. This is verified in comparing the crosslinking results of Comparative Examples 1 and 2 in Table III in the Experimental section.

Therefore it was quite unexpected that the liquid peroxide blends of this invention would be such efficient crosslinking agents. It was expected that the liquid peroxide blends containing significant amounts of II and III would have a marked fall off in efficiency when compared to I. The commercial advantages of liquid peroxides over solid peroxides in crosslinking applications far outweigh the slight decrease in efficiency experienced when the liquid peroxide blends of this invention are substituted for I (see Table III in Experimental Section).

SUMMARY OF THE INVENTION

This invention relates to novel peroxide blends which are liquid at room temperature (about 25° C.) or at even lower temperatures, their method of preparation and their use in curing peroxide crosslinkable polymers and to curable compositions containing blends of the peroxide and curable polymers. The liquid peroxide blends can be uniformly admixed with polymers such as polyethylene without going through preliminary expensive and dangerous melting steps which are necessary at the present time with the commercial crosslinking agents which only exist as liquids at temperatures well above 25° C. They may also be dispersed on solid fillers without employing cryogenic grinding and blending techniques which are required with the solid peroxides.

The blend of peroxides provided by the first composition aspect of this invention, comprises a mixture of the meta isomers, or a mixture of the meta and para isomers of Formulae I, II and III, in such proportions that the composition is liquid at 25° C. or lower. The peroxide blend comprises 5 to 65 parts by weight I, 10 to 55 parts by weight II and 3 to 55 parts by weight III where the ratio of the meta isomer to the para isomer is selected to provide a peroxide blend which is liquid at 25° C. or lower. Preferably, the blend comprises from about 7 to 61 parts by weight I, from 30 to 55 parts by weight II and from 3 to 47 parts by weight III and the ratio of the meta isomer to para isomer ranges from at least 1.5:1 to pure meta isomer. The blend optionally may contain small amounts of monoperoxides (up to 15% by weight) of Formula IV. As the percentage of compounds II and III in the blend decreases, the tendency of the blend to solidify at room temperature (25° C.) increases. As the percentage of the meta isomer increases from 50% to 80%, the mixture can tolerate more of the Formula I compound and still remain liquid at room temperature. Likewise as the percentage of the meta isomer increases at a constant composition of I, II, and III the blend remains liquid at lower temperatures. Since t-amyl hydroperoxide is slightly more expensive than the t-butyl hydroperoxide and compound III is slightly less efficient than compound I (see crosslinking evaluations of comparative Example 1 and comparative Example 3 in Table III), it is economically advantageous to maximize the amount of compound I and minimize the amount of compound III in the blend and still provide a composition liquid at the desired temperature. The ratio of I:III can be maximized by optimizing the ratio of the meta and para isomers of I, II, and III in the blend. Preferably, a ratio of about 1.5:1 to about 9:1 of the meta isomers to the para isomers or substantially pure meta isomers are employed in the blend. Most preferably a ratio of approximately 2.0:1 to 5:1 of the meta isomers to the para isomers or only the meta isomers are employed in the blend. The freezing point of the blend may be further lowered by adding compound III, preferably the meta isomer, to the blend. Both the meta and para isomers of III are liquids but the meta isomer has a lower freezing point.

When the blend is composed of only the meta isomer it comprises 5 to 65 parts by weight of a diperoxide of Formula I, from 10 to 55 parts by weight of a diperoxide of Formula II, and from 3 to 55 parts by weight of a diperoxide of Formula III. Preferably it comprises from 30 to 61 parts by weight I, from 35 to 47 parts by weight II and from 4 to 16 parts by weight III.

When the blend is a mixture of the meta and para isomers of I, II, and III, it comprises 5 to 65 parts by weight I, from 10 to 55 parts by weight II and from 3 to 55 parts by weight III and the ratio of the meta to para isomer is from 1:1 to 99:1. Preferably it comprises from 40 to 60 parts by weight I, from 36 to 55 parts by weight II and from 4 to 17 parts by weight III and the ratio of the meta to para isomer is from 1.5:1 to 9:1. Most preferably the ratio is from 2.0:1 to 5:1.

All the peroxide blends are liquids at 25° C. The lower the mole ratio of t-butyl hydroperoxide to t-amyl hydroperoxide employed in the synthetic step, the lower the temperature at which the compositions may be stored without solidifying. Some compositions will remain liquid at 15° C. or at even lower temperatures (0°–5° C.). Addition of the meta isomer III also lowers the freezing point.

It is also contemplated by this invention to add some dicumyl peroxide (V) to these blends provided the dicumyl peroxide dissolves in the blend and the blend remains liquid at room temperature (25° C.). Likewise minor amounts of a peroxide of Formula XI may also be added to the blend as long as the blend remains a liquid at room temperature (25° C.).

The invention also provides in a second composition aspect a curable composition comprising a blend of peroxides of the first composition aspect of this invention admixed with at least one peroxide curable polymer.

DESCRIPTION OF THE PREFERRED EMBODIMENTS

METHODS OF PREPARATION

The peroxide blends may be prepared by any of the following methods:

1. Mixing the compounds of Formulae I, II, and III in the desired amounts within the designated ranges.

2. Reacting a mixture of t-butyl hydroperoxide and t-amyl hydroperoxide with a diol of Formula XIII in a molar ratio of total hydroperoxide to diol of 1.8–3.0:1, preferably 2.0–2.3:1, in the presence of an acid catalyst. The diol may be the pure meta diol, or a mixture of the meta and para diols containing the desired ratio of meta to para diol.

3. Reacting a mixture of t-butyl hydroperoxide and t-amyl hydroperoxide with meta diisopropenylbenzene (XVI) or a mixture of meta and para diisopropenylbenzenes (XVI) in the presence of the dichloride or dibromide of Formula XVII, the monochloride or monobromide of Formula XVIII or a mixture thereof, where Y is chlorine or bromine

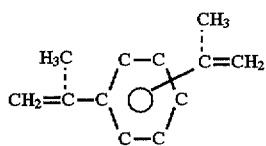

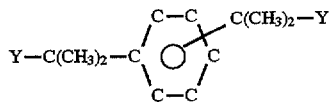

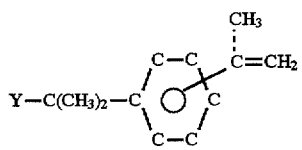

4. Reacting a mixture of t-butyl hydroperoxide and t-amyl hydroperoxide with meta diisopropylbenzene or a mixture of meta and para diisopropylbenzenes in the presence of a transition metal salt.

Mixtures of t-butyl hydroperoxide and t-amyl hydroperoxide may be prepared either by mixing the previously prepared hydroperoxides in the desired ratio, or the two starting materials, t-butyl alcohol and t-amyl alcohol, may be mixed in the appropriate ratio and then reacted with hydrogen peroxide in the presence of an acid catalyst, for example sulfuric acid, to produce a mixture of the two desired hydroperoxides containing also di-t-butyl peroxide, di-t-amyl peroxide and t-amyl t-butyl peroxide. A hydrocarbon type solvent may be added during the reaction or afterward to provide a solution containing the hydroperoxides at a concentration suitable for further reaction to prepare the liquid mixtures containing the peroxides of Formulae I, II and III.

Another alternative method for the direct preparation of the hydroperoxide mixture is to absorb isobutylene and isopentene simultaneously in aqueous sulfuric acid and then treat the mixture of sulfate esters so formed with hydrogen peroxide. The mixture may also be prepared by separately absorbing each of the two olefinic hydrocarbons in sulfuric acid, mixing the esters and then treating with hydrogen peroxide.

METHOD 1

This method is not a very commercially feasible route to the liquid peroxide blends because it requires the individual preparation of each of the components prior to preparing the blend. Compound I can be prepared by reacting t-butyl hydroperoxide with a diol of Formula XIII using a molar ratio of t-butyl hydroperoxide to diol of approximately 2.0–2.3 to 1 in the presence of an acid catalyst (U.S. Pat. No. 3,584,059). Compound I is available commercially from Hercules Inc. under the trade name "Vulcup", from Elf Atochem Italia under the trade name "Peroxyimon F" and from Elf Atochem N.A. under the trade name "Luperox 802". Compound III can be prepared by reacting t-amyl hydroperoxide with a diol of Formula XIII using a molar ratio of hydroperoxide to diol of 2.0–2.5:1 in the presence of an acid catalyst. Compound II can be prepared by reacting t-butyl hydroperoxide with a diol of Formula XIII using a molar ratio of t-butyl hydroperoxide to diol of approximately 0.9–1.1:1 in the presence of an acid catalyst. The half product of Formula IV, where R is t-butyl and R' is 2-hydroxy-2-propyl, is obtained. The half product is then reacted with t-amyl hydroperoxide using a mole ratio of t-amyl hydroperoxide to half product of approximately 0.9–1.4 to 1 in the presence of an acid catalyst. Compound II may also be prepared by reacting the diol with t-amyl hydroperoxide first then reacting the resulting half product (where R is t-amyl) with t-butyl hydroperoxide (see C.A. 85, 142748d).

METHOD 2

This is the preferred method of preparing the liquid peroxide blends. The reaction of t-butyl hydroperoxide with bis-(2-hydroxy-2-propyl)benzene in the presence of acid condensation catalysts is well known in the art (see Can. Pat. 754,613). Method 2 is a modification of this procedure where a mixture of t-butyl hydroperoxide and t-amyl hydroperoxide is used instead of t-butyl hydroperoxide alone.

The peroxide blends may be prepared by reacting a mixture of t-butyl hydroperoxide and t-amyl hydroperoxide with a diol of Formula XIII in a molar ratio of total hydroperoxide to diol of 1.8–3.0 to 1. The diol may be the pure meta diol, or a mixture of the meta and para diols where the mixture contains the desired percentage of the meta diol. Suitable acid catalysts are any strong organic or inorganic acid catalyst such as perchloric acid, sulfuric acid, phosphoric acid, hydrochloric acid, benzenesulfonic acid, methanesulfonic acid, p-toluenesulfonic acid, —$SO_3H$ substituted ion exchange resins, trifluoroacetic acid and acids having $pKa \leq 2.5$ in aqueous solution at 25° C. Other acidic catalysts suitable for the reaction include anhydrides of carboxylic acids having a $pKa > 2.85$ as per U.S. Pat. No. 4,198,528 and synthetic $SiO_2$—$Al_2O_3$ (Japan Tokkyo Koko 81 20,568; C.A. 95, 42650). When using an aqueous strong acid solution such as 60–80% sulfuric acid, the reaction is generally carried out at temperatures above −5° C. and below 40° C. The optimum reaction temperature is dependent upon the identity and amount of the acid condensation catalyst and the amount of water present. The reaction may be run without a solvent or in the presence of an inert solvent or mixture of solvents, for example, aromatic hydrocarbons such as benzene, toluene, cumene, xylene, and the like, aliphatic hydrocarbons such as pentane, hexane and heptane, cycloaliphatic hydrocarbons such as cyclohexane, ethers such as diethyl ether and methyl t-butyl ether and chlorinated hydrocarbons such as methylene chloride, chloroform, chlorobenzene, and dichlorobenzene.

Preferably, a slight stoichiometric excess of a mixture of t-butyl and t-amyl hydroperoxide is reacted with meta bis(2-hydroxy-2-propyl)benzene XIII (or a mixture of the meta and para isomers of XIII) in the presence of aqueous sulfuric acid. Preferably the diol XIII is slurried in the mixture of hydroperoxides at 15°–30° C. using a mole ratio of hydroperoxide to diol of approximately 1.8–2.5 to 1. Reaction is initiated by adding the acid, preferably 68% to 73% aqueous sulfuric acid, to the mixture while controlling the reaction temperature between 15°–30° C. and most preferably at 20° C. ±2° C. Preferably the mole ratio of sulfuric acid to diol is 1.8–3.5 to 1 and most preferably the mole ratio is 2.0–3.0 to 1. The reaction can readily be monitored by gas chromatography. The ratio of the products can be varied by varying the mole ratio of the t-butyl hydroperoxide to the t-amyl hydroperoxide from 0.25–2.5 to 1. Preferably the mole ratio of the t-butyl hydroperoxide to t-amyl hydroperoxide is 1.0–2.35 to 1.0. Most preferably the ratio is 1.5–2.25 to 1.0. Preferably the mole ratio of hydroperoxide to diol is 2.0–2.5 to 1. Most preferably the ratio is 2.0–2.3 to 1.

The peroxide blend may also be prepared by adding a portion of the hydroperoxides to the diol, adding a corresponding portion of the acid catalyst and allowing reaction to occur, adding another portion of the hydroperoxide mixture and then a corresponding portion of the acid until the additions are complete and then stirring until reaction is essentially complete. Likewise, the diol may be slurried in one of the hydroperoxides, a corresponding amount of acid added and reaction allowed to occur. Then the other hydroperoxide may be added and the rest of the acid added and the resulting mixture stirred until reaction is essentially complete. If this method is employed, it is preferable to react the t-amyl hydroperoxide first. The order of addition may be reversed where the aqueous sulfuric acid is added to the diol at 0°–5° C. and then the hydroperoxides are added, either as a mixture or incrementally, to the acid slurry at 0°–10° C. The reaction temperature is then allowed to rise slowly up to as high as 40° C., preferably only as high as 30° C. and the reaction mixture is stirred until essentially all of the diol has reacted.

After reaction is complete, the crude product is separated from the acid catalyst or the acid is neutralized. Preferably, the acid layer is separated and the crude product is washed with an alkali metal hydroxide solution, preferably 5–15% aqueous sodium hydroxide or potassium hydroxide, washed with water until neutral and stripped of volatiles. Addition of an inert solvent such as those previously mentioned can speed up the separations and minimize mechanical loss of product.

METHOD 3 comprises the reaction of a t-butyl/t-amyl hydroperoxide mixture with 1,3-bis(2-chloro-2-propyl)benzene, 1-(2-chloro-2-propyl)-3-isopropenylbenzene, a mixture of 1,3 and 1,4-bis(2-chloro-2-propyl)benzene, a mixture of 1-(2-chloro-2-propyl)-3-isopropenylbenzene and 1-(2-chloro-2-propyl)-4-isopropenylbenzene or a mixture thereof, in the presence of meta diisopropenylbenzene or a mixture of meta and para diisopropenylbenzene, under relatively non-aqueous conditions. The reaction generates peroxides I, II, and III and liberates hydrogen chloride. The reaction may be catalyzed by the addition of an unhindered phenol. Under these conditions the hydrogen chloride generated reacts with the diisopropenylbenzenes to regenerate the bis(2-chloro-2-propyl)benzene, 1-(2-chloro-2-propyl)-3- or 4-isopropenylbenzene or mixture thereof. The 1-(2-chloro-2-propyl)-3- or 4-isopropenylbenzene can react with more hydrogen chloride later in the reaction to form 1,3- or 1,4-bis(2-chloro-2-propyl)benzene or can react with a hydroperoxide to form 1-(2-t-alkylperoxy-2-propyl)-3- or 4-(2-chloro-2-propyl)benzene which can then react with more hydroperoxide to form compound I, II or III.

The bis(2-chloro-2-propyl)benzene/(2-chloro-2-propyl) isopropenylbenzene solution can be generated in situ by adding dry hydrogen chloride to diisopropenylbenzene until about 5–20% of the isopropenyl groups are converted to 2-chloro-2-propyl groups. Alternatively bis(2-chloro-2-propyl)benzene can be prepared by adding dry hydrogen chloride to diisopropenylbenzene until essentially all the isopropenyl groups are converted to 2-chloro-2-propyl groups. The bis(2-chloro-2-propyl)benzene may alternatively be diluted to the desired concentration with diisopropenylbenzene or it can be added directly to the mixture of diisopropenylbenzene, t-butyl hydroperoxide, t-amyl hydroperoxide and phenol.

Preferably about 5–20%, most preferably 7–12%, of the isopropenyl groups of the diisopropenylbenzene are converted to 2-chloro-2-propyl groups, the mixture of hydroperoxides is added to it and a phenol catalyst is added. Increasing the concentration of the 2-chloro-2-propyl groups increases the reaction rate but usually increases the amount of impurities generated as well. The mole ratio of isopropenyl groups plus 2-chloro-2-propyl groups to hydroperoxide groups can vary from 0.5–1.3 to 1.

The reactants may be charged to the reactor in any order but it is preferable to add either the phenol or the (2-chloro-2-propyl)benzene/1-(2-chloro-2-propyl)isopropenylbenzene solution last. Preferably, a solution of the phenol in the hydroperoxide mixture is added to the solution of the 2-chloro-2-propylbenzenes in diisopropenylbenzene.

The system does not have to be completely anhydrous but water does have a rate retarding effect. It has been found beneficial in some cases, from an ease of handling standpoint, to use liquified phenol which contains about 9% water. When using liquified phenol, the amount of phenol used must be increased by about 10% to override the rate retarding effect of the water. Other suitable unhindered phenols include ortho, meta and para cresols, chlorophenols, bromophenols, methoxyphenols, ethylphenols, isopropylphenols and para-t-butylphenol. From a practical standpoint, it is advantageous to use an inexpensive, low molecular weight phenol which can be readily extracted out of the reaction mixture with aqueous caustic. Phenol and the meta and para cresols or mixtures thereof are especially suitable.

The ratio of the products I, II and III can be varied by varying the mole ratio of the t-butyl hydroperoxide to the t-amyl hydroperoxide from 0.25–2.5 to 1. Preferably the mole ratio of t-butyl hydroperoxide to t-amyl hydroperoxide is 1.0–2.35 to 1 and most preferably the ratio is 1.5–2.25 to 1. The ratio of the meta isomers to the para isomers of I, II and III may be varied by varying the ratio of the starting meta and para diisopropenylbenzenes. The ratio of the meta diisopropenylbenzene to the para diisopropenylbenzene should be at least 1:1 and more preferably should be at least 2:1 and most preferably the ratio should be at least 2.5:1 or the diisopropenylbenzene should be exclusively the meta isomer.

The reaction is run in the temperature range of 10°–50° C., preferably 15°–45° C. Since the phenol acts as a catalyst, the reaction temperature and time are dependent upon the amount of phenol added. When small amounts of phenol are added, the reaction will take longer and should be run at a higher temperature than when larger amounts of phenol are added. In practice, it is preferable to start the reaction out at a low temperature, 15°–25° C., while the bulk of the reaction is taking place and then program the temperature up as the reaction slows down. The reaction can be monitored by gas chromatography so one of skill in the art may easily determine if the temperature should be raised or lowered.

After the reaction is essentially complete, the crude reaction mixture is washed with dilute solutions of sodium or potassium hydroxide to remove the phenol and residual hydroperoxides and to hydrolyze any residual (2-chloro-2-propyl)benzenes. The crude product is then washed with water to neutral and the volatiles are stripped off under reduced pressure.

The peroxide blend may also be prepared by reacting meta-diisopropenylbenzene or a mixture of meta- and para-diisopropenylbenzene with a mixture of t-butyl and t-amyl hydroperoxides in the presence of aqueous hydrochloric acid using the procedure of Example 2 in U.S. Pat. No. 4,864, 064.

METHOD 4

This method involves the metal catalyzed decomposition of hydroperoxides in the presence of isopropylbenzenes. M. S. Kharasch and A. Fono (J. Org. Chem. 23 p.324(1958)) reported on the preparation of alpha-cumyl t-butyl peroxide by the reaction of t-butyl hydroperoxide with cumene in the presence of a metal salt. In the same manner bis(2-t-butylperoxy-2-propyl)benzene (I) may be prepared by the metal catalyzed decomposition of t-butyl hydroperoxide in the presence of diisopropylbenzene. A mole ratio of 4:1 t-butyl hydroperoxide to diisopropylbenzene is required. If a mixture of t-butyl hydroperoxide and t-amyl hydroperoxide is used and the molar ratio of hydroperoxide to diisopropylbenzene is at least 4:1 then one obtains a product containing peroxides I, II and III.

The reaction can be catalyzed by salts of vanadium, chromium, manganese, iron, cobalt, nickel and copper. The salts may be inorganic such as the halides and sulfates or organic such as the naphthenates, acetylacetonates and carboxylates of organic acids. Since the hydroperoxides act both as oxidizing and reducing agents toward metal salts, the salts used may have the metal in any of its oxidation states. Preferably one may use cuprous chloride, cupric chloride, cobaltous acetate, cupric 2-ethylhexanoate, cobaltous 2-ethylhexanoate or cobaltic stearate.

The reaction time may vary from a few hours to a few days depending upon the catalyst type and amount, reaction temperature, the presence or absence of a solvent and the amount of hydroperoxide employed. Preferably the hydroperoxides are added in portions and the reaction is run between 50° and 80° C. The higher the catalyst concentration, the lower the reaction temperature should be held to eliminate or minimize induced decomposition of the hydroperoxides. Suitable inert solvents include benzene, toluene, methanol, isopropanol, ethanol, t-butanol, hexane, chloroform and acetic acid. Aqueous solutions of the metal salt may also be employed.

The catalyst concentration may vary from about 0.001 to about 0.1 mole of catalyst per mole of hydroperoxide. Preferably about 0.01 to 0.05 mole of catalyst per mole of hydroperoxide is employed.

Preferably, after the reaction is essentially complete, any catalyst residues are filtered off, the crude reaction product is treated with 5–10% additional hydroperoxide 60–80% aqueous sulfuric acid at 20°–30° C. for 10–30 minutes to convert any 2-hydroxy-2-propylbenzene side products to either I, II or III. The acid is separated, the crude product washed with 5–10% sodium or potassium hydroxide, washed with water to neutral and the volatiles stripped off under reduced pressure.

The hydroperoxides may be added sequentially or as mixtures. The ratio of the products I, II and III may be varied by varying the mole ratio of the t-butyl hydroperoxide to the t-amyl hydroperoxide from 0.25–2.5 to 1. Preferably, the mole ratio of the t-butyl hydroperoxide to the t-amyl hydroperoxide is 1.0–2.35 to 1 and most preferably the ratio is 1.5–2.25 to 1. The ratio of the meta isomers to the para isomers of compounds I, II and III may be varied by varying the meta to para ratio of the starting diisopropylbenzenes. The ratio of the meta isomers to the para isomers should be at least 1:1 and preferably should be at least 1.5:1, or exclusively the meta isomer.

The blends prepared by Methods 2, 3 and 4 may be modified to obtain a lower freezing point by adding additional compound III, preferably the meta isomer, prepared as described in Method 1.

UTILITY

The novel blends of this invention are useful in the crosslinking of natural or synthetic materials which are thermoplastic or elastomeric in nature and which can be crosslinked through the action of a free radical crosslinking agent. Being liquids, the novel blends of this invention can be uniformly dispersed into the polymeric materials without going through expensive and potentially hazardous melting steps. Examples of suitable crosslinkable polymeric materials include low density polyethylene, linear low density polyethylene, high density polyethylene, ethylene-propylene copolymers and terpolymers, ethylene-vinyl acetate copolymers, chlorinated polyethylene, silicone rubber, natural rubber(cis-1,4-polyisoprene), polyurethane rubber, 1,4-polybutadiene, styrene-butadiene rubber, acrylonitrile-butadiene rubber, isoprene rubber, acrylonitrile-butadiene-styrene copolymers, styrene-butadiene-styrene rubber, styrene-isoprene-styrene copolymers and chloroprene rubber. Reference to the crosslinkable polymers can be found in *Rubber World*, "Elastomer Crosslinking with Diperoxyketals", October, 1983, pp. 26–32 and *Rubber and Plastics News*, "Organic Peroxides for Rubber Crosslinking", Sept. 29, 1980, pp. 46–50.

The amount of the peroxide blend crosslinking agent present in the crosslinkable polymeric composition should be sufficient to afford the desired degree of crosslinking. The amount of peroxide blend can range from 0.1 to 10 parts by weight for each 100 parts by weight of polymeric compound. Preferably, 0.5 to 5 PHR (parts per hundred parts resin) of the peroxide blend will be employed.

The crosslinkable composition containing the proper amount of the peroxide blend is heat cured for a time sufficient to obtain the desired degree of crosslinking. The heat curing has a temperature-time relationship which is dependent on the crosslinkable polymer and the amount and composition of the peroxide blend. The crosslinking is preferably carried out at 300°–500° F. (149°–260° C.) in 0.5 to 30 minutes.

The polymeric compositions may also contain one or more fillers or carriers. Some of the commonly used fillers are calcium carbonate, calcium silicate, silica, various grades of clay, carbon black, titanium dioxide and alkaline earth metal carbonates. The polymeric compositions to be crosslinked may also contain co-agents such as triallyl cyanurate, triallyl isocyanurate, liquid 1,2-polybutadiene and various poly functional methacrylates and acrylates.

The novel blends of this invention are also useful as polymerization initiators for vinyl monomers such as styrene, butadiene, isoprene, acrylonitrile, vinyl chloride, ethyl acrylate, methyl methacrylate, vinyl acetate, acrylic acid, vinyl stearate, vinylidene chloride and mixtures thereof. The novel blends of this invention are also useful as initiators for grafting vinyl monomers onto ethylene and propylene homo- or copolymers. Examples of suitable grafting monomers include maleic anhydride, maleimide and N-substituted maleimides, acrylic and methacrylic acids, mono and diesters of maleic acid, styrene, acrylonitrile and acrylamide. The novel blends are also useful for curing polyester resins.

EXPERIMENTAL

The following examples are presented to provide a more detailed explanation of the present invention and of the preferred embodiments thereof and are intended as illustrations and not limitations.

The meta isomer of bis(2-hydroxy-2-propyl)benzene was obtained from Sumitomo Chemical Co. The para isomer was obtained from Mitsui Chemical Co. Mixtures of the meta and para isomers were prepared by mixing the two isomers in the indicated amounts. The meta and para diols and their mixtures were also prepared by alkylating benzene with propylene in the presence of $AlCl_3$, separating the diisopropylbenzene fraction, oxidizing it with air using conventional techniques, extracting the meta and para dihydroperoxides of diisopropylbenzene with aqueous caustic and reducing the aqueous extract with sodium hydrogen sulfide in conventional fashion to form an aqueous suspension of the dialcohol containing about 35% para isomer and about 65% of the meta isomer. Aqueous t-butyl hydroperoxide (70%) is a product of Arco Chemcial Co. t-Amyl Hydroperoxide (82%–85%) is a product of Elf Atochem North America., Inc. Dutral® CO 054 is an ethylene/propylene copolymer. Riblene® CF 2203 is a low density polyethylene. Anox® HB is a 2,2,4-trimethyl-1,2-dihydroquinoline polymer. Sclair® is a high density polyethylene resin.

The reactions of Examples I through XXXIII and Comparative Examples 1 through 5 were carried out in stirred jacketed reactors equipped with a thermometer and a bottom outlet valve.

The curing reactions of Examples XXXIV through XXXVI were conducted in a Monsanto ODR-100 oscillating disk rheometer (Model R-100). Scorch times were determined in Examples XXXV and XXXVI using a Mooney viscometer.

Monoperoxides present as by-products in any of the bisperoxides prepared as indicated may be removed by the method of U.S. Pat. No. 3,584,059, the disclosure of which is incorporated herein by reference.

Gas and liquid chromatographic analyses are reported as weight percent.

EXAMPLE I

To the reactor were added 138 grams of a heptane solution containing 0.26 mole of t-butyl hydroperoxide and 0.26 mole of t-amyl hydroperoxide, 6.1 grams of water and 56 grams of dialcohol of Formula XIII containing about 0.167 mole of the meta isomer and 0.089 mole of the para isomer. The stirrer was activated and the slurry cooled to 5° C. by pumping cold water through the jacket. To the cooled slurry was added 119 grams (0.85 mole) of 70% sulfuric acid over 1 hour under nitrogen while controlling the temperature between 5°–8° C. by circulating ice water through the reactor jacket. After the addition was complete, the reaction was stirred an additional hour at 5°–8° C.

The crude reaction mixture was settled and the lower acid layer separated. The organic layer was then washed twice at 60° C. with 500 ml portions of 10% aqueous soda and twice with 250 ml portions of deionized water. The heptane was removed by steam distillation and the residue dried at 65° C. under vacuum. The product was a liquid, weighed 67 grams and had an Act(O) content of 7.43%. Gas chromatographic analysis indicated the product was a mixture consisting of 19% meta I, 12% para I, 26% meta II, 20% para II, 8% meta III and 7% para III. The product remained a liquid at 15° C.

EXAMPLE II

The procedure of Example I was repeated except the dialcohol of Formula XIII was exclusively the meta isomer. The dried product was a liquid, weighed 60 grams and had an Act (O) content of 7.8%. Gas chromatographic analysis indicated the product was a mixture consisting of 30% meta I, 43% meta II and 16% meta III. The product remained a liquid at 15° C.

EXAMPLE III

The procedure of Example I was repeated except the heptane solution contained 0.13 mole of t-butyl hydroperoxide and 0.39 mole of t-amyl hydroperoxide. The dialcohol of Formula XIII was a mixture of 0.167 mole of the meta isomer and 0.089 mole of the para isomer. The dried product was a liquid, weighed 66 grams and had an Act(O) content of 7.27%. Gas chromatographic analysis indicated the product was a mixture consisting of 6% meta I, 3% para I, 22% meta II, 15% para II, 24% meta III and 19% para III. The product remained a liquid at 15° C.

EXAMPLE IV

The procedure of Example I was repeated except the heptane solution contained 0.124 mole of t-butyl hydroperoxide and 0.373 mole of t-amyl hydroperoxide. The meta isomer (0.234 mole) of the dialcohol of Formula XIII was used. The dried product was a liquid, weighed 56 grams and had an Act(O) content of 7.62%. Gas chromatographic analysis indicated the product was a mixture consisting of 9% meta I, 37% meta II and 43% meta III. The product remained a liquid at 15° C.

EXAMPLE V

To the reactor were added 84.2 grams (1.0 mole) of 88% aqueous t-butyl alcohol, 100 grams (1.0 mole) of 88% aqueous t-amyl alcohol and 197 grams of heptane. The stirrer was activated and 126 grams (2.6 mole) of 70% hydrogen peroxide and 126 grams (0.9 mole) of 70% sulfuric acid were added simultaneously over a period of 1 hour while maintaining the temperature at 35° C. After addition was complete, the resulting mixture was stirred for an additional two hours at 35° C. At the end of the stir period, the aqueous layer was settled and separated. Gas chromatographic analysis of the heptane solution (386 grams) indicated the presence of 20.7% t-butyl hydroperoxide and 23.9% t-amyl hydroperoxide.

The procedure of Example I was repeated except 113 grams of the above heptane solution (containing 0.26 mole of t-butyl hydroperoxide and 0.26 mole of t-amyl hydroperoxide) was used as the hydroperoxide solution. The dialcohol of Formula XIII was a mixture of 0.167 mole of the meta isomer and 0.089 mole of the para isomer. The dried product was a liquid, weighed 66 grams and had an Act(O) content of 7.53%. Gas chromatographic analysis indicated the product was a mixture consisting of 15% meta I, 11% para I, 25% meta II, 21% para II, 9% meta III and 8% para III. The product remained a liquid at 15° C.

EXAMPLE VI

Following a procedure analogous to that described in Example V, 21 grams of 88% t-butyl alcohol, 75 grams of 88% t-amyl alcohol and 100 grams of n-heptane were stirred with 63 grams of 70% hydrogen peroxide in the presence of 70% sulfuric acid to provide 199 grams of a heptane solution of hydroperoxides. Gas chromatographic analysis of the heptane solution indicated it contained 10% t-butyl hydroperoxide and 30% t-amyl hydroperoxide.

130 grams of the heptane solution from above (contains 0.144 mole of t-butyl hydroperoxide and 0.375 mole t-amyl hydroperoxide) were stirred with 126 grams of 70% sulfuric acid, 6.1 grams of water and 0.167 mole of the meta isomer and 0.089 mole of the para isomer of the dialcohol of Formula XIII. The product, after workup and drying, was a liquid, weighed 67 grams and had an Act(O) content of 7.27%. Gas chromatographic analysis indicated the product was a mixture consisting of 5% meta I, 3% para I, 21% meta II, 17% para II, 23% meta III and 19% III. The product remained a liquid at 15° C.

EXAMPLE VII

To the reactor was added 20.4 grams (0.105 mole) of 1,3-bis(2-hydroxy-2-propyl)benzene, 19.8 grams (0.154 mole) of aqueous 70% t-butyl hydroperoxide, 9.8 grams (0.077 mole) of aqueous 82% t-amyl hydroperoxide and 1.5 grams of water. The stirrer was activated and the mixture stirred vigorously to form a thick slurry. The temperature of the slurry was adjusted to 14° C. by pumping cold water through the jacket. To the cooled slurry was added 44.1 grams (0.316 mole) of 70% sulfuric acid dropwise over 13 minutes while controlling the temperature between 14°–21° C. by circulating 15°–18° C. water through the reactor jacket. After the addition was complete, the reaction was stirred an additional hour at 20°–21° C.

The crude reaction mixture was diluted with 40 mls of hexane and 50 mls of water and the lower acid layer settled and separated. The organic layer was then washed with 50 ml portions of 7½% sodium hydroxide solution, water and saturated sodium bicarbonate solution. All of the washes were of 5 minute duration at 30° C. The washed hexane solution was dried over 10 grams of anhydrous sodium sulfate, filtered and the hexane was stripped off on a rotary evaporator under water aspirator vacuum. The residue was stripped an additional 45 minutes at 50°–60° C. with a vacuum pump to remove any residual volatiles. The residue was a pale yellow liquid weighing 32.5 grams. Liquid chromatographic analysis of the product indicated it was a mixture consisting of 49.1% meta I, 36.2% meta II and 7.3% meta III. It did not solidify upon storage at room temperature.

EXAMPLE VIII

To the reactor was added 20.4 grams (0.105 mole) of 1,3-bis(2-hydroxy-2-propyl)benzene, 14.9 grams (0.116 mole) of aqueous 70% t-butyl hydroperoxide, 14.5 grams (0.116 mole) of aqueous 83% t-amyl hydroperoxide and 2.0 grams of water. The stirrer was activated and 26.8 grams (0.21 mole) of 77% sulfuric acid were added dropwise over 20 minutes while controlling the reaction temperature at 17°–22° C. The reaction was stirred an additional 2 hours at 20° C. and then worked up as in Example I. The stripped residue was a light yellow liquid that weighed 29.8 grams. The gas chromatographic analysis indicated the residue was a mixture consisting of 36.1% meta I, 43.5% meta II and 13.4% meta III. The residue was placed in a refrigerator overnight at 0°–5° C. and did not solidify.

EXAMPLE IX

To the reactor was added 16.3 grams (0.084 mole) of 1,3-bis(2-hydroxy-2-propyl)benzene, 4.1 grams (0.021 mole) of 1,4-bis(2-hydroxy-2-hydroxy-2-propyl)benzene, 19.8 grams (0.154 mole) of aqueous t-butyl hydroperoxide, 9.6 grams (0.077 mole) of aqueous t-amyl hydroperoxide and 1.5 grams of water. The stirrer was activated and 26.8 grams (0.21 mole) of 77% sulfuric acid were added dropwise over 12 minutes while controlling the temperature at 23°–31° C. The reaction was stirred an additional 1½ hours at 30° C. and then worked up as in Example I. The residue was a light yellow liquid that weighed 29.2 grams. The product remained liquid upon storage at room temperature (23° C.). Liquid chromatographic analysis indicated the product contained approximately 40.1% meta I, 13.6% para I, 28.2% meta II, 10.8% para II, 4.9% meta III and 2.4% para III. A sample of the product was stored in the refrigerator at 0°–5° C. The sample remained liquid for 3 days.

EXAMPLES X–XXX

Examples X to XXX were carried out using the general procedure of Example VII. The total amount of bis(2- hydroxy-2-propyl)benzene used was 20.4 grams (0.105 mole). The percent meta isomer and percent para isomer in the starting diol is given in Table I. The mole ratio of hydroperoxide to diol was 2.2 to 1. The mole ratio of t-butyl hydroperoxide to t-amyl hydroperoxide used in each example is also given in Table I. 70% aqueous t-butyl hydroperoxide was used as such, 85% aqueous t-amyl hydroperoxide was diluted with water to 78% before using (Examples XXIII and XVIV used 70% instead of 78% t-amyl hydroperoxide). The acid catalyst used was 44.1 grams (0.316 mole) of 70% sulfuric acid. The acid was added over approximately 15 minutes while holding the reaction temperature at 14°–16° C. by circulating cold water through the reactor jacket. After the addition was complete the reaction was stirred an additional hour at 20°–22° C.

The crude product was worked up and stripped according to the procedure in Example VII. All the products were pale yellow liquids that remained liquid at 23° C. Table I demonstrates that many of the products remained liquid upon storage at 15° C. and some remained liquid upon storage at 3° C. The approximate product compositions are also found in Table I.

Comparative Example 1

1,3-Bis(2-t-butylperoxy-2-propyl)benzene (meta I) was prepared by reacting 29.7 grams (0.231 mole) of aqueous 70% t-butyl hydroperoxide with 20.4 grams (0.105 mole) of 1,3-bis(2-hydroxy-2-propyl)benzene in the presence of 26.8 grams (0.21 mole) of 77% sulfuric acid according to the procedure of Example I. The stripped product weighed 32.6 grams. It crystallized upon cooling and had a melting point of 45°–52° C. This example is for comparative purposes and does not fall under the specifications of this invention. The peroxide assay was 97% of theoretical.

Comparative Example 2

1,3-Bis(2-t-amylperoxy-2-propyl)benzene (meta III) was prepared by reacting 28.1 grams (0.231 mole) of aqueous 85.7% t-amyl hydroperoxide diluted with 3.2 grams of water with 20.4 grams (0.105 mole) of 1,3-bis(2-hydroxy-2-propyl)benzene in the presence of 44.1 grams (0.316 mole) of 70% sulfuric acid according to the procedure of Example VII. The stripped product was a yellow liquid which did not solidify in a freezer at −17° C. The product weighed 29.9 grams and assayed 95% as 1,3-bis(2-t-amylperoxy-2-propyl)benzene and contained about 5% 1-(2-t-amylperoxy-2-propyl)-3-(2-hydroxy-2-propyl)-benzene. The product remained a liquid at 15° C.

Comparative Example 3

1,4-Bis(2-t-amylperoxy-2-propyl)benzene (para III) was prepared by reacting 28.1 grams (0.231 mole) of aqueous 85.7% t-amyl hydroperoxide diluted with 3.2 grams of water with 20.4 grams (0.105 mole) of 1,4-bis(2-hydroxy-2-propyl)benzene in the presence of 44.1 grams (0.316 mole) of 70% sulfuric acid according to the procedure of Example VII. The stripped product was a yellow liquid which remained liquid at 15° C. The product weighed 32.0 grams.

Comparative Example 4

Comparative Example 3 was repeated except the dialcohol of Formula XIII was a mixture of 12.2 grams (0.063 mole) of the meta isomer and 8.2 grams (0.042 mole) of the para isomer. The stripped product was a yellow liquid and did not solidify in the freezer at −17° C. The product contained 55.4% 1,3-bis(2-t-amylperoxy-2-propyl)benzene (meta III) and 41.9% of the para isomer (para III).

Comparative Example 5

A heptane solution (647 grams) containing 1.84 moles of t-amyl hydroperoxide and 174 grams of an aqueous suspension composed of 17.5 grams of water, 0.53 mole of the meta isomer of the dialcohol of Formula XIII and 0.28 mole of the para isomer were added to the reactor. The stirrer was activated and the slurry cooled to 5° C. by pumping cold water through the jacket. To the cooled slurry, under a nitrogen atmosphere, 331 grams of 70% aqueous sulfuric acid solution was slowly added over 30 minutes while maintaining the temperature at 5°–8° C. After the addition was complete, the reaction was stirred an additional hour at 5°–8° C.

The crude reaction mixture was settled and the lower acid layer separated. The organic layer was then washed twice at 60° C. with 500 ml portions of 10% aqueous soda and twice with 200 ml portions of deionized water. The heptane was removed by steam distillation and the residue dried at 65° C. under vacuum. The product was a liquid and had an Act(O) content of 6.97%. Gas chromatographic analysis indicated the product was a mixture consisting of 45% meta III and 36% para III.

EXAMPLES XXXIa–XXXIIIa

Examples XXXI–XXXIII were carried out using the general procedure used for Examples X–XXX. Examples XXXIa and XXXIIa were prepared by diluting 9 parts of the products of Examples XXXI and XXXII with 1 part 1,3-bis(2-t-amylperoxy-2-propyl)benzene from Comparative Example 2. Example XXXIIIa was prepared by diluting 9 parts of the product of Example XXXIII with 2 parts 1,3-bis(2-t-amylperoxy-2-propyl)benzene. The products of Examples XXXIa, XXXIIa and XXXIIIa remained liquids at lower temperatures than the products of XXXI, XXXII and XXXIII. The approximate compositions of the diluted and undiluted samples are found in Table II.

EXAMPLE XXXIV

Crosslinking Evaluations in High Density Polyethylene

The products from Examples VII and VIII and Comparative Examples 1 and 2 were evaluated in the crosslinking of high density polyethylene. All samples were run on an equal active oxygen basis, therefore samples less than 95% assay were corrected for assay.

40 grams of duPont's Sclair® high density polyethylene resin was added to a C. W. Brabender Plastigraph with type-5 mixing blades. The mixer was heated to 140° C. (just high enough to melt mix the resin) and the mixing speed was set at 30 RPM. The polyethylene was melted and then 1.69 PHR (corrected for assay) of the 10 peroxide was slowly added to the molten resin. The total mixing time was 6–7 minutes. The compounded resin was removed and pressed out into a flat sheet between two pieces of Mylar using a room temperature Carver laboratory press (Model C). Upon cooling to room temperature, round discs approximately 1 inch in diameter were cut out of the sheet for crosslinking evaluation of the peroxide in the formulation using the Monsanto ODR-100 Oscillating Disk Rheometer (Model R-100).

The Monsanto Rheometer test procedure (ASTM-D-2084-71T) is performed on uncured samples, enclosed under positive pressure in a heated die cavity containing a biconical disk. The disk is oscillated (100 cycles/min) through an arc of 3°. The twisting torque, which is measured by a dynameter, is the opposition of the molten polymer against the rotation of the disk. The torque required to oscillate the disk is recorded as a function of time and is proportional to the degree of crosslinking of the polymer. The shear modulus increases as percent crosslinking increases and the curve generated is a representation of the extent of cure reaction with time. The test variables recorded from the rheometer are:

$M_H$ is the maximum torque generated in the test. It is measured in inch-lbs (or dyne-cms.) and is a measure of the crosslinking attained.

$M_L$ is the minimum torque recorded in the test and is measured in inch-lbs (or dyne-cms.). It is a measure of the viscosity of the compound and is an indicator of scorch. Increased $M_L$ values are indicative of scorch.

$M_H-M_L$ is the difference between maximum and minimum torque values recorded in the test and is an indication of the extent of crosslinking. The greater the $M_H-M_L$ value, the greater the degree of crosslinking.

$T_c$ is the cure time in minutes.

$T_{c90}$ is the time required to reach 90% of the maximum torque. It is defined as $(M_H-M_L)0.9 +M_L$.

$T_S$ is the scorch time in minutes. Scorch is the premature and unwanted vulcanization which occurs during extrusion of a curable polymeric mixture from the die of an extruder. Scorch time is the time before this premature vulcanization occurs. It is the time the sample is at the test temperature before a prescribed increase in viscosity occurs.

$T_{S2}$ is the time required for the torque to increase two inch-lbs above $M_L$.

$T_{S10}$ is the time required for the torque to increase 10 inch-lbs above $M_L$.

Ten grams of the polyethylene discs prepared above were added to the Monsanto rheometer at a temperature of 385° F. (196° C.) and a mixing speed of 30 RPM. The torque in inch-lbs was measured vs time. The results are summarized in Table III. After correcting for assay, the crosslinking efficiency of the blends prepared from Examples VII and VIII were slightly lower than the crosslinking efficiency of the blend prepared from pure 1,3-bis(2-t-butylperoxy-2-propyl)benzene (Comparative Example 1). The $M_H$ values and the $M_H-M_L$ values were slightly lower, the cure times were a little faster and the scorch times ($T_{S2}$) were comparable. The crosslinking results obtained with the blends of Examples VII and VIII were considerably better than the results obtained with the blend prepared with 1,3-bis(2-t-amylperoxy-2-propyl)benzene (Comparative Example 2).

Effectiveness of crosslinking was also determined by extracting 0.5 gram samples of the crosslinked polyethylene with 100 mls of xylene at 110° C. for 24 hours. The swollen test specimen was removed and surface xylene removed by air blowing. The test specimen was weighed, placed in a vacuum oven at 100° C. and dried to constant weight under vacuum. The percent insolubles and the swell ratio were then determined by the following formulae:

$$\% \text{ insolubles} = \frac{\text{weight after extraction and drying}}{\text{original weight of polyethylene}} \times 100$$

$$\text{swell ratio} = 1 + \frac{\text{wt swollen gel} - \text{wt dry gel}}{\text{wt dry gel}} (K)$$

K=ratio of density of polyethylene at immersion temp.=1.17

The % insolubles and swell ratios are found in Table III.

The greater the degree of crosslinking, the lower the amount of extracted material and the smaller the swell ratio. A large swell ratio indicates a low density of crosslinks and a low swell ratio indicates a more tightly bound structure.

The % insolubles obtained from xylene extraction of the crosslinked blends prepared from Examples VII and VIII were slightly higher than the % insolubles obtained from the xylene extraction of the crosslinked blend prepared from pure 1,3-bis(2-t-butylperoxy-2-propyl)benzene (Comparative Example 1) (see Table III) indicating the crosslinking efficiency of the peroxide mixtures of Examples VII and VIII were approximately equivalent to the crosslinking efficiency of the peroxide of Comparative Example 1. In contrast, the % insolubles obtained from xylene extraction of the crosslinked blend prepared from 1,3-bis(2-t-amylperoxy-2-propyl)benzene (Comparative Example 2) were considerably lower indicating the liquid peroxide of Comparative Example 2 has a much lower crosslinking efficiency than the peroxides of Examples VII and VIII. The swell ratios also indicate that the liquid peroxides of Examples VII and VIII are much better crosslinking agents than the liquid peroxide of Comparative Example 2 and nearly as efficient as the solid peroxide of Comparative Example 1.

EXAMPLE XXXV

Curing of Ethylene/Propylene Elastomer copolymer 100 parts by weight of Dutral® CO 054 was mixed with 0.3 parts by weight of sulfur, 5 parts by weight of zinc oxide and 50 parts by weight carbon black. To this mixture was added approximately 2.2 parts peroxide (see Table IV) and the resulting mixture homogenized on a calendar for 5 minutes. A sample was placed in the oscillating disk rheometer (ODR) at 170° C. and the ODR curve generated using an oscillation angle of 3° and a frequency of oscillation of 100 cycles/minute. From the ODR curve, the $M_H$, the $T_{S10}$ and the $T_{C90}$ were determined.

The "scorch" times $t_2$ and $t_5$ were determined with a Mooney viscometer with an oscillating disk at 135° C. (standard ASTM D 1646-81). $t_2$ and $t_5$ are defined as the time required to reach an increase in the viscosity of 2 or 5 Mooney units from the minimal value, respectively. The results are summarized in Table IV. The $M_H$ values indicate that the peroxide blends of Examples I and III are better curing agents for ethylene/propylene elastomers than the peroxides of Comparative Example 5.

EXAMPLE XXXVI

Crosslinking of Low Density Polyethylene 100 parts by weight Riblene® CF 2203 low density polyethylene were mixed with 0.5 part by weight Anox® HB and 0.5 part by weight triallyl cyanurate (TAC). To this mixture was added approximately 2.2 parts by weight of peroxide (see Table V) and the resulting mixture blended to homogeneity on a calendar. A sample was placed in the oscillating disk rheometer at 170° C. and the ODR curve generated using an oscillation angle of 1° and a frequency of oscillation of 100 cycles/minute. From the ODR curve, the $M_H$, the $T_{S10}$ and the $T_{C90}$ were determined. The "scorch" times, $t_5$ and t10 were determined with the Mooney viscometer at 135° C. The results are summarized in Table V. The larger $M_H$ values indicate the peroxides of Examples V and VI are better crosslinking agents for low density polyethylene than the peroxides of Comparative Example 5.

TABLE I

LIQUID PEROXIDE COMPOSITIONS

| EXAMPLE | m/p | TBHP/TAHP | I (m) | I (p) | II (m) | II (p) | III (m) | III (p) | IV (m,p) | Liquid at 15 C. | Liquid at 3 C. |
|---|---|---|---|---|---|---|---|---|---|---|---|
| X | 100:0 | 1.25:1 | 38.9 | 0.0 | 46.5 | 0.0 | 11.2 | 0.0 | 0.0 | + | + |
| XI | 100:0 | 1.5:1 | 44.2 | 0.0 | 43.5 | 0.0 | 9.2 | 0.0 | 0.0 | + | + |
| XII | 100:0 | 1.75:1 | 52.7 | 0.0 | 38.3 | 0.0 | 6.3 | 0.0 | 0.0 | + | + |
| XIII | 100:0 | 2.25:1 | 55.8 | 0.0 | 35.7 | 0.0 | 5.2 | 0.0 | 1.0 | + | + |
| XIV | 100:0 | 2.35:1 | 58.7 | 0.0 | 35.7 | 0.0 | 4.5 | 0.0 | 1.1 | + | + |
| XV | 50:50 | 1.00:1 | 15.3 | 13.9 | 26.8 | 26.6 | 9.7 | 7.8 | 0.0 | + | − |
| XVI | 60:40 | 1.35:1 | 17.9 | 8.8 | 38.0 | 13.9 | 9.2 | 4.3 | 3.9 | + | − |
| XVII | 60:40 | 1.00:1 | 18.6 | 10.3 | 31.5 | 22.2 | 11.0 | 6.5 | 0.0 | + | − |
| XVIII | 65:35 | 1.50:1 | 27.1 | 12.5 | 31.4 | 17.2 | 7.3 | 3.6 | 0.9 | − | − |
| XIX | 65:35 | 1.60:1 | 27.9 | 20.1 | 24.2 | 16.7 | 6.9 | 3.3 | 0.9 | + | − |
| XX | 65:35 | 1.75:1 | 28.1 | 16.8 | 28.1 | 13.3 | 9.9 | 3.1 | 0.7 | + | − |
| XXI | 65:35 | 1.85:1 | 30.6 | 17.6 | 26.5 | 15.9 | 5.8 | 2.8 | 0.8 | − | − |
| XXII | 70:30 | 1.50:1 | 30.0 | 12.6 | 33.0 | 14.2 | 8.0 | 2.3 | 0.0 | + | − |
| XXIII | 70:30 | 2.00:1 | 35.2 | 16.7 | 25.5 | 6.0 | 1.9 | 0.0 | 14.7 | + | − |
| XXIV | 70:30 | 2.25:1 | 32.4 | 17.0 | 19.8 | 11.8 | 1.1 | 0.0 | 14.4 | + | − |
| XXV | 75:25 | 2.00:1 | 38.4 | 12.6 | 30.8 | 10.6 | 5.5 | 1.2 | 0.9 | − | − |
| XXVI | 80:20 | 1.75:1 | 38.6 | 8.9 | 35.1 | 9.0 | 7.4 | 1.0 | 0.0 | + | + |
| XXVII | 80:20 | 2.00:1 | 41.0 | 9.7 | 33.1 | 8.6 | 5.8 | 0.8 | 0.9 | + | + |
| XXVIII | 80:20 | 2.25:1 | 43.9 | 13.9 | 27.7 | 8.0 | 4.8 | 0.7 | 1.0 | − | − |
| XXIX | 90:10 | 2.00:1 | 46.6 | 5.2 | 36.2 | 4.4 | 6.6 | 0.0 | 1.0 | + | + |
| XXX | 90:10 | 2.35:1 | 49.7 | 0.0 | 40.4 | 3.0 | 6.1 | 0.0 | 0.8 | + | + |

TABLE II

PEROXIDE COMPOSITIONS

| EXAMPLE | m/p | TBHP/TAHP | I (m) | I (p) | II (m) | II (p) | III (m) | III (p) |
|---|---|---|---|---|---|---|---|---|
| XXXI | 70:30 | 1.75:1 | 33.0 | 13.7 | 31.1 | 13.6 | 6.6 | 2.0 |
| XXXIa | | | 30.4 | 11.6 | 28.3 | 11.9 | 16.2 | 1.6 |
| XXXII | 80:20 | 2.35:1 | 44.9 | 11.3 | 30.8 | 8.1 | 4.9 | 0.0 |
| XXXIIa | | | 41.1 | 9.9 | 28.6 | 7.1 | 13.3 | 0.0 |
| XXXIII | 60:40 | 1.35:1 | 24.4 | 15.0 | 29.4 | 19.1 | 7.6 | 4.5 |
| XXXIIIa | | | 20.8 | 13.0 | 26.6 | 18.1 | 17.4 | 4.1 |

TABLE III

CROSSLINKING EVALUATIONS

| EXAMPLE | STARTING RATIO t-BuOOH:t-AmOOH | M(H) | M(H)-M(L) | T(C90) | T(S2) | % INSOLUBLES | SWELL RATIO |
|---|---|---|---|---|---|---|---|
| Example VII | 2:1 | 65 | 64 | 3.6 | 1.2 | 93.5 | 6.3 |
| Example VIII | 1:1 | 70 | 67 | 3.6 | 1.2 | 93.8 | 6.4 |
| Comparative Ex 1 | 1:0 | 73 | 72 | 3.8 | 1.2 | 93.2 | 6.1 |
| Comparative Ex 2 | 0:1 | 61 | 58 | 3.4 | 1.1 | 90.5 | 7.2 |

TABLE IV

CURING OF ETHYLENE/PROPYLENE ELASTOMER

| Curing Agent Peroxide Ex # | PHR Peroxide | Cure Temp °C. | M (H) inch-lbs | T (S10) seconds | T (C90) seconds | t (2) seconds | t (5) seconds |
|---|---|---|---|---|---|---|---|
| Example I | 2.12 | 170 | 88.5 | 132 | 810 | 582 | 852 |
| Example III | 2.20 | 170 | 82.0 | 138 | 732 | 570 | 852 |
| Comparative Ex 5 | 2.26 | 170 | 74.5 | 150 | 672 | 588 | 930 |

TABLE V

CROSSLINKING OF LOW DENSITY POLYETHYLENE

| Curing Agent Peroxide Ex # | PHR Peroxide | Crosslinking Temp °C. | M (H) inch-lbs | T (S10) seconds | T (C90) seconds | t (5) seconds | t (10) seconds |
|---|---|---|---|---|---|---|---|
| Example V | 2.11 | 170 | 19.07 | 126 | 963 | 1437 | 1740 |
| Example VI | 2.19 | 170 | 17.54 | 140 | 1097 | 1437 | 1751 |
| Comparative Ex 5 | 2.26 | 170 | 16.93 | 135 | 950 | 1034 | 1236 |

The subject matter which applicants regard as their invention is particularly pointed out and distinctly claimed as follows:

1. A composition comprising a mixture of compounds having the structures:

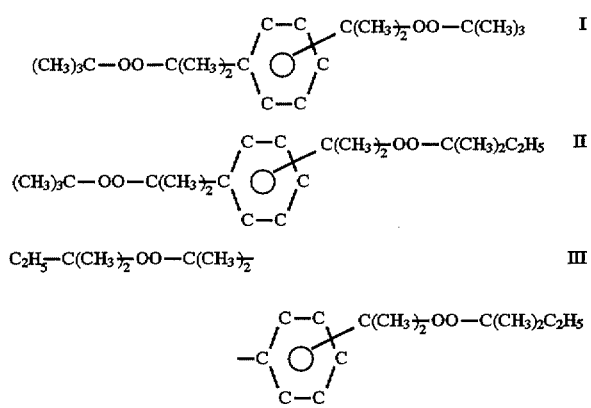

and from 0% to about 15% by weight of a compound having the formula IV.

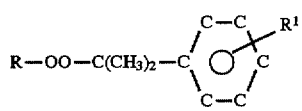

wherein R may be t-butyl or t-amyl; R1 may be hydrogen, isopropyl, isopropenyl or 2-hydroxy-2-propyl; wherein the compound of formula IV is present as the meta isomer, as the para isomer or as a mixture of the meta and para isomers; wherein the compounds of formulas I, II and III are independently present as meta isomers, or mixtures of meta and para isomers, and the relative proportions of the compounds of formulas I, II, III and IV and of the meta and para isomers of the compounds of formulas I, II and III are selected to provide a mixture liquid at 25° C.

2. A composition as defined in claim 1 which is substantially free of compound IV.

3. A peroxide composition liquid at 25° C. comprising a mixture of the meta or meta and para isomers of compounds of Formulas I, II, III and from 0% to 15% by weight of the peroxide blend, of the meta or the meta and para isomers of the monoperoxide of Formula IV, prepared by reacting 1.8–3.0 moles of a mixture of t-amyl and t-butyl hydroperoxide per mole of meta or mixture of meta and para bis(2-hydroxy-2-propyl)benzene in the presence of an acid catalyst at a temperature of 5° to 40° C. until reaction is essentially complete and recovering the product mixture so produced.

4. A composition as defined in claim 1 wherein the relative proportions of compounds I, II and III and the meta and para isomer ratio of compounds I, II and III are selected to provide a liquid mixture at 15° C.

5. A liquid peroxide blend of claim 1 which consists essentially of 5 to 65 parts by weight of the compounds of Formula I, from 10 to 55 parts by weight of the compounds of Formula II, from 3 to 55 parts by weight of the compounds of Formula III and from 0 to 15 parts by weight of the compounds by Formula IV and the ratio of the meta to the para isomer of I, II, III and IV is at least 1.0:1.

6. A liquid peroxide blend of claim 5 which consists essentially of 7 to 61 parts by weight of I, from 30 to 55 parts by weight of II, from 3 to 47 parts by weight of III and from 0 to 5 parts by weight IV where R may be t-butyl or t-amyl and R' is 2-hydroxy-2-propyl and the ratio of the meta and para isomers of I, II, III and IV may vary from 1.5:1 to all meta.

7. A liquid peroxide blend of claim 6 which consists essentially of 35 to 60 parts by weight I, from 35 to 55 parts by weight II, from 5 to 20 parts by weight III and from 0 to 5 parts by weight IV where the ratio of the meta to para isomers of I, II, III and IV is from 1.5:1 to all meta.

8. A liquid peroxide blend of claim 6 which consists essentially of 28 to 53 parts by weight I, from 40 to 55 parts by weight II, from 6 to 17 parts by weight III and from 0 to 5 parts by weight IV where the ratio of the meta to para isomer of I, II, III and IV is from about 2.0:1 to about 2.5:1.

9. A liquid peroxide blend of claim 6 which consists essentially of 28 to 57 parts by weight I, from 35 to 55 parts by weight II, from 4 to 17 parts by weight III and from 0 to 5 parts by weight IV where the ratio of the meta to para isomers of I, II, and III and IV is from about 2.5:1 to about 4.0:1.

10. A liquid peroxide blend of claim 6 which consists essentially of 28 to 61 parts by weight I, from 35 to 55 parts by weight II, from 4 to 17 parts by weight III and from 0 to 5 parts by weight IV where the ratio of the meta to para isomers of I, II, III and IV is about 4:1 or larger.

11. A liquid peroxide blend of claim 6 which consists essentially of 28 to 61 parts by weight of the meta isomer of Formula I, from 35 to 55 parts by weight of the meta isomer of Formula II, from 4 to 17 parts by weight of the meta isomer of Formula III and from 0 to 5 parts by weight of the meta isomer of Formula IV.

12. A liquid peroxide blend of claim 11 which consists essentially of 40 to 61 parts by weight I, from 35 to 47 parts by weight II, from 4 to 13 parts by weight III and from 0 to 5 parts by weight IV.

13. A liquid peroxide blend of claim 10 which consists essentially of 45 to 53 parts by weight I, from 35 to 43 parts by weight II, from 5 to 13 parts by weight III and from 0 to 5 parts by weight IV.

14. A liquid peroxide blend of claim 9 which consists essentially of 45 to 53 parts by weight I, from 35 to 43 parts by weight II, from 5 to 13 parts by weight III and from 0 to 5 parts by weight IV.

15. A liquid peroxide blend of claim 8 which consists essentially of 45 to 57 parts by weight I, from 35 to 43 parts by weight II, from 4 to 13 parts by weight III and from 0 to 5 parts by weight IV where the ratio of the meta to para isomers of I, II, III and IV is from 4:1 to 9:1.

* * * * *